A. S. HICKLEY.
ELECTROLYTIC CELL.
APPLICATION FILED NOV. 25, 1907.
982,493. Patented Jan. 24, 1911.
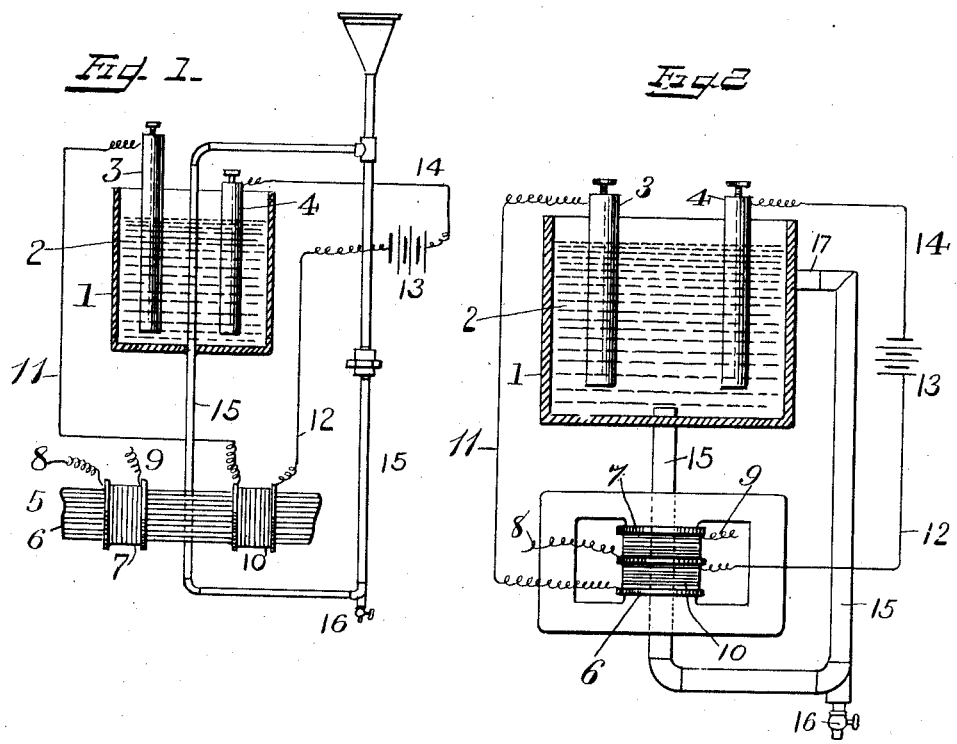
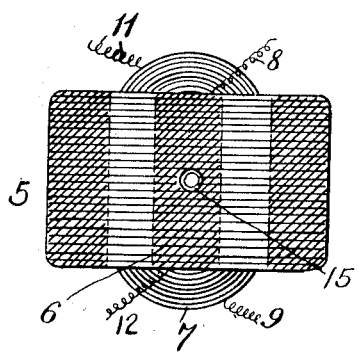
Witnesses
J. L. Durand
W. Parker Reinohl
Inventor
A. S. Hickley
By D. J. Reinohl
Attorney

UNITED STATES PATENT OFFICE.

ARTHUR S. HICKLEY, OF MANASQUAN, NEW JERSEY, ASSIGNOR TO COMO ELECTRICAL COMPANY, A CORPORATION OF NEW JERSEY.

ELECTROLYTIC CELL.

982,493.      Specification of Letters Patent.      Patented Jan. 24, 1911.

Application filed November 25, 1907. Serial No. 403,783.

*To all whom it may concern:*

Be it known that I, ARTHUR S. HICKLEY, a subject of the King of Great Britain, residing at Manasquan, in the county of Monmouth and State of New Jersey, have invented certain new and useful Improvements in Electrolytic Cells; and I do hereby declare the following to be a full, clear, and exact description of the invention, such as will enable others skilled in the art to which it appertains to make and use the same.

My invention relates primarily to electrolytic cells, has especial reference to such cells adapted for rectifying alternating currents to direct, has for its object the heating of the electrolyte to maintain a predetermined temperature, or prevent the temperature of the electrolyte becoming too low for effective service, and the invention consists in certain improvements which will be fully disclosed in the following specification and claims.

In the accompanying drawings, which form part of this specification:—Figure 1 represents a side elevation partly in section of a device embodying my invention. Fig. 2 a like view of a modification of the device, and Fig. 3 a top plan view of the transformer shown in Fig. 2, detached.

Reference being had to the drawings and the designating characters thereon, the numeral 1 indicates an electrolytic cell, 2 the electrolyte which may be liquid or semi-liquid in form and composed of chemicals in solution well-known to the art, 3, 4, the electrodes, one of which is positive and the other negative and composed of any preferred material for the purpose, 5 a transformer composed of a core 6, preferably laminated iron, the primary coil 7 provided with wires 8, 9, to be connected to the A. C. main lines, not shown, and the secondary coil 10 provided with wires 11 and 12, one of which is connected to the electrode 3 and the other to a battery 13 or other electrical device, and from thence to the other electrode through wire 14.

15 is a pipe which passes through the core 6 of the transformer and through the electrolyte in the cell, and contains a liquid which is heated by Foucault or eddy currents in the core of the transformer and the heat thereof communicated to the electrolyte as the liquid is circulated through the pipe 15, and the electrolyte is also put in circulation in the cell 1 by the heat imparted thereto. The pipe 15 is provided with a pet cock 16 for drawing off the liquid in the pipe when heating of the electrolyte is not required or when it is desired to draw the electrolyte from the cell 1.

In Fig. 2, the pipe 15 connects with the cell 1 near the upper end thereof by a branch 17 and said pipe also connects with the bottom of the cell to provide for circulating the electrolyte through the pipe 15 and the cell for heating the electrolyte in the cell, the heat derived being physically conducted from the core of the transformer to the electrolyte.

It is obvious that other changes in details of construction may be made without departing from the spirit of my invention.

Having thus fully described my invention, what I claim is—

1. An electrolytic cell, a transformer, means for circulating a liquid through the cell, and mechanical connections between the core of the transformer and the cell, whereby heat generated in the core of the transformer by Foucault or eddy currents is communicated to the electrolyte in the cell.

2. The combination of an electrolytic cell and a transformer, and means whereby the waste heat of the transformer is used for warming the electrolytic cell.

In testimony whereof I affix my signature, in presence of two witnesses.

ARTHUR S. HICKLEY.

Witnesses:
    D. C. REINOHL,
    W. PARKER REINOHL.